(12) United States Patent
Lukac et al.

(10) Patent No.: US 9,530,194 B2
(45) Date of Patent: *Dec. 27, 2016

(54) METHOD FOR PROCESSING HIGHLIGHTS AND SATURATED REGIONS IN A DIGITAL IMAGE

(71) Applicant: Foveon, Inc., Santa Clara, CA (US)

(72) Inventors: Rastislav Lukac, Santa Clara, CA (US); Ken Doyle, Santa Clara, CA (US)

(73) Assignee: Foveon, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/168,155

(22) Filed: Jan. 30, 2014

(65) Prior Publication Data
US 2014/0321742 A1    Oct. 30, 2014

Related U.S. Application Data

(62) Division of application No. 13/473,313, filed on May 16, 2012, now Pat. No. 8,842,912.
(Continued)

(51) Int. Cl.
*G06K 9/00*    (2006.01)
*G06T 5/00*    (2006.01)
(Continued)

(52) U.S. Cl.
CPC ............. *G06T 5/008* (2013.01); *G06K 9/40* (2013.01); *G06T 5/001* (2013.01); *H04N 9/646* (2013.01);
(Continued)

(58) Field of Classification Search
None
See application file for complete search history.

(56) References Cited

U.S. PATENT DOCUMENTS 6,487,271 B1   11/2002   Laurent
6,642,960 B1   11/2003   Kohashi et al.
(Continued)

FOREIGN PATENT DOCUMENTS

JP    2003060983 A    2/2003
JP    2003348349       12/2003
(Continued)

OTHER PUBLICATIONS

Soriano et al., Making saturated facial images useful again, Proc. SPIE 3826, Polarization and Color Techniques in Industrial Inspection, Munich, Germany, Jun. 1999, pp. 113-121.
(Continued)

*Primary Examiner* — Feng Niu
(74) *Attorney, Agent, or Firm* — Leech Tishman Fuscaldo & Lampl; Kenneth D'Alessandro, Esq.

(57) ABSTRACT

A method for performing highlight restoration on a digital image includes comparing the pixels in the image with a saturation level value to identify saturated pixels. A saturation map of saturated pixels is generated. Each selected saturated pixel is identified as a restorable pixel only if at least one color channel of the pixel is unsaturated. For each restorable pixel, a group of the closest unsaturated pixels above, below, to the left, and to the right of the select saturated pixel is identified. A replacement pixel value is generated for each saturated color channel of the restorable pixel, using a combination of the pixel values of the unsaturated color channels of the restorable pixel and the pixel values of the corresponding color channels of the nearby unsaturated pixels.

12 Claims, 10 Drawing Sheets

Related U.S. Application Data

(60) Provisional application No. 61/487,887, filed on May 19, 2011, provisional application No. 61/534,556, filed on Sep. 14, 2011.

(51) Int. Cl.
*G06K 9/40* (2006.01)
*H04N 9/64* (2006.01)
*H04N 9/68* (2006.01)

(52) U.S. Cl.
CPC ....... *H04N 9/68* (2013.01); *G06T 2207/10024* (2013.01); *G06T 2207/20172* (2013.01)

(56) References Cited

U.S. PATENT DOCUMENTS

| | | | |
|---|---|---|---|
| 6,937,362 B1 | 8/2005 | Spaulding et al. | |
| 7,593,603 B1 | 9/2009 | Wilensky | |
| 8,014,626 B2* | 9/2011 | Chiba | H04N 5/2351 382/166 |
| 8,537,234 B2 | 9/2013 | Litvinov et al. | |
| 2003/0222991 A1 | 12/2003 | Muammar et al. | |
| 2005/0140804 A1 | 6/2005 | Adams, Jr. et al. | |
| 2007/0103564 A1* | 5/2007 | Chiba | H04N 5/2351 348/223.1 |
| 2013/0027591 A1* | 1/2013 | Lukac et al. | 348/242 |

FOREIGN PATENT DOCUMENTS

| | | |
|---|---|---|
| JP | 2004140692 | 5/2004 |
| JP | 2007133591 A | 5/2007 |
| JP | 2008227977 | 9/2008 |

OTHER PUBLICATIONS

Zhang et al., Estimation of saturated pixel values in digital color imaging, J. Opt. Soc. Am. A, vol. 21, No. 12, Dec. 2004, pp. 2301-2310.

Mansour et al., Color Image Desaturation Using Sparse Reconstructions, in Proc. IEEE Int. Conf. Acoust., Speech, Signal, Process, Dallas, TX, Mar. 2010, pp. 778-781.

Xu et al., Saturated-Pixel Enhancement for Color Images, In Proceedings of 2010 IEEE International Symposium on Circuits and Systems (ISCAS), May 30, 2010-Jun. 2, 2010, Paris, France, pp. 3377-3380.

Xu et al., Correction of Clipped Pixels in Color Images, IEEE Trans. Visualization and Computer Graphics, vol. 17, No. 3, Mar. 2011, pp. 333-344.

Japan Patent Office, Office Action issued in Japanese Application No. 2014-088883, Apr. 4, 2016, 4 pages.

Japan Patent Office, Office Action issued in Japanese Application No. 2014-088881, Jun. 27, 2016, 8 pages.

* cited by examiner

METHOD FOR PROCESSING HIGHLIGHTS AND SATURATED REGIONS IN A DIGITAL IMAGE

RELATED APPLICATIONS

This application is a divisional patent application of U.S. patent application Ser. No. 13/473,313, filed May 16, 2012, which claims priority from U.S. Provisional Patent Application Ser. No. 61/487,887, filed May 19, 2011 and from U.S. Provisional Patent Application Ser. No. 61/534,556, filed Sep. 14, 2011.

BACKGROUND

1. Field of the Invention

The present invention relates to processing of digital images. More particularly, the present invention relates to methods for processing highlights in a digital image to perform highlight restoration and highlight neutralization.

2. The Prior Art

When one or more color channels in a pixel saturate, the relative values of red (R), green (G), and blue (B) are no longer accurate. As a result, the final pixel color is likely to be incorrect. To correct saturated pixels which are typically present in image regions with highlights, digital manufacturers usually apply color desaturation or neutralization. The level of such neutralization usually reduces with the increased distance of the pixel value from the saturation level to minimize the neutralization effect on nonsaturated pixels. Since such correction methods affect both the color information and the dynamic range of the image, a different solution is needed.

BRIEF DESCRIPTION

According to the present invention, methods are disclosed for processing of highlights and saturated regions in digital images using the digital camera capture parameters, the saturation map indicating the image values clipped by the image sensor due to its saturation, and image data not affected by the sensor clipping. The present invention is an efficient method for processing saturated regions in a digital camera image. The method uses the saturation map to guide the correction process. This map indicates pixels that are clipped (reached the allowed maximum value) by the image sensor when it saturates and/or due to image processing. Correcting saturated or clipped pixels avoids color artifacts in the output image.

The restoration process is guided by the saturation map which can usually be obtained directly from the image sensor data or at any location in the imaging pipeline by simply comparing the pixel values with a predetermined threshold. In the example described here, the saturation map is a three-channel binary map of each pixel in the image, where a value of 1 indicates that the particular color component was saturated and a value of 0 indicates color components not affected by the saturation/clipping. Other representations of the saturated map can also be used.

A method for performing highlight restoration on a digital image includes comparing the pixels in the image with a saturation level value to identify saturated pixels. A saturation map of saturated pixels is generated. Each selected saturated pixel is identified as a restorable pixel only if at least one color channel of the pixel is unsaturated. For each restorable pixel, a group of the closest unsaturated pixels above, below, to the left, and to the right of the select saturated pixel is identified. A replacement pixel value is generated for each saturated color channel of the restorable pixel, using a combination of the pixel values of the unsaturated color channels of the restorable pixel and the pixel values of the corresponding color channels of the nearby unsaturated pixels.

According to another aspect of the present invention, a method for performing highlight restoration on a digital image includes comparing the pixels in the image with a saturation level value to identify saturated pixels. A saturation map of saturated pixels is generated. Each saturated pixel is identified as a restorable pixel only if at least one color channel of the pixel is unsaturated. For each restorable pixel, a group of the closest unsaturated pixels above, below, to the left, and to the right of the select saturated pixel is identified. A replacement pixel value is generated for each saturated color channel of the restorable pixel, using a combination of the pixel values of the unsaturated color channels of the restorable pixel and the pixel values of the corresponding color channels of the nearby unsaturated pixels.

The method of the present invention deals with signal saturation issues using restoration and neutralization concepts. The former estimates the saturated color components using available image information, whereas the latter moves all channels in the saturated pixel towards a neutral (gray) value.

When one or more color channels in a pixel saturate, the relative values of red, green, and blue are no longer accurate. As a result, the final pixel color is likely to be incorrect. For example, considering a 12-bit image representation, if the value of the blue channel of a pixel ought to be 6100, but instead saturates at 4095, the relative values of the red and green channels are too high for the pixel's blue value, which will cause the pixel to appear yellower than it should. The restoration process will attempt to find the proper value for the blue channel, while the neutralization process will alter all channels in the pixel to become grayer, while preserving the pixel's luminance. Since the luminance of saturated pixels tends to be high, the typical neutralization result is that the pixel will appear white. To produce visually pleasing images, the neutralization process should be used in severe cases when the restoration process will likely fail.

The method of the present invention allows using either restoration or neutralization to correct the image. In a more advanced version, the method of the present invention uses the two procedures, restoration and neutralization, in sequence to process each pixel since the restoration process can produce some artifacts in complex situations, for example, when there is not enough unsaturated pixels with appropriate color characteristics and/or the image is heavily overexposed.

According to another aspect of the present invention, two approaches for processing saturated regions in digital images, one based on the correction table and another that uses unsaturated pixels available in a local neighborhood, can be combined. In example implementations, each saturated pixel can be corrected as the average or weighted average of the two intermediate pixels produced using these two approaches.

BRIEF DESCRIPTION OF THE DRAWING FIGURES

DETAILED DESCRIPTION

Figure 1:
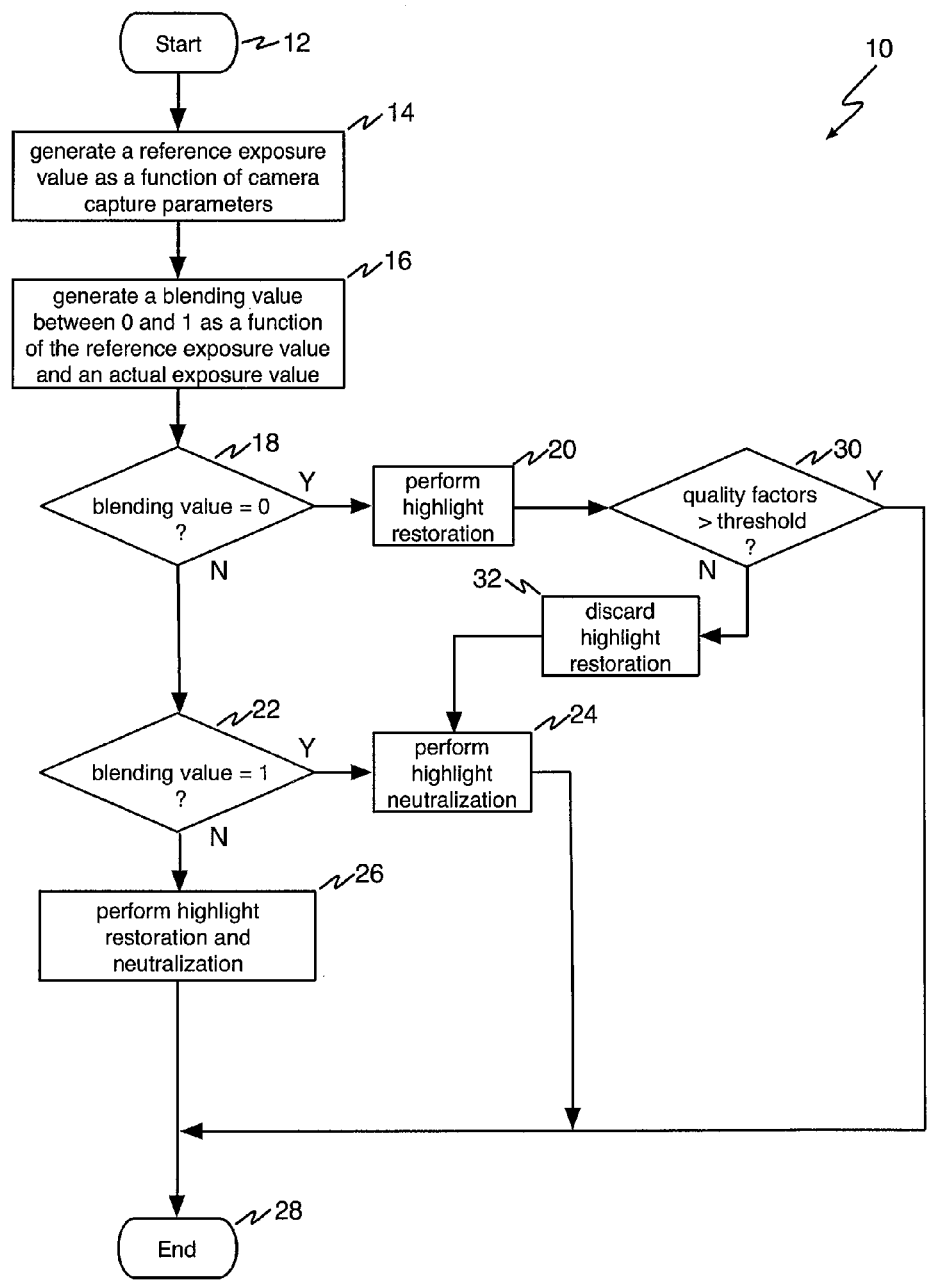
FIG. 1 is a flow diagram showing an illustrative method for performing highlight restoration or neutralization on a digital image according to an aspect of the present invention.

Persons of ordinary skill in the art will realize that the following description of the present invention is illustrative only and not in any way limiting. Other embodiments of the invention will readily suggest themselves to such skilled persons.

The method of the present invention can be used to build a correction table. According to one aspect of the invention the entire image is analyzed for pixels where the color channel in question is not saturated. This can be combined with other constraints, for example, the pixels to be used in building the table of correction factors have to have their luminance value larger than a certain threshold and cannot have any of their color channels clipped, etc. For each of these pixels that are selected to build this correction table at least two values are calculated, each a function of one or more color channels. One value is used as an index into the table of correction factors, whereas the other value is the correction factor itself. Note that the method of the present invention allows calculating more than one correction factor if such operational characteristics are required.

The number of entries in the table of correction factors is denoted by the table size a. This design parameter is usually predetermined. Typically, a is set as smaller than or equal to the number of bits used to represent each color channel. Memory efficient implementations may target smaller a values (for instance, a=255 for 12 bits per color channel representation); however, too small values may reduce the accuracy of correction since too different pixels will be associated with the same index.

The index value is a function of one or more color channels. Consider the B channel being corrected and M being the design parameter, usually equal to the maximum allowed value in a given bit representation (other settings are also possible). In one example, the index is a function of one or two color channels not being restored; for instance, such a function can be defined as amin(R,M)/M, amin(G,M)/M, aR/(R+G), or aG/(R+G), with min denoting the minimum operator. In another example, the index is a function of the color channel being restored; for instance, such a function can be defined as amin(B,M)/M. In yet another example, the index is a function of the color channel being restored and one or both other color channels; for instance, such a function can be defined as aB/(R+G+B). Note that the final index is a rounded version of the index value calculated as described above.

The correction factors can also be determined in more than one way. Consider again the B channel being corrected. In one example, the correction factor is calculated as a scaled value of the color channel being corrected; that is, yB where y is either predetermined or adaptively determined based on image statistics. In another example, the correction factor is calculated as a ratio of the color channel to be corrected to one of the other two color channels in the pixel; for instance, such as a correction factor can be defined as B/G, or B/R. In another example, the correction factor is calculated as a difference between the color channel to be corrected and one of the other two color channels in the pixel, that is, B−G or B−R for instance. In another example, the correction factor is calculated as a function of the color channel to be corrected and both other color channels in the pixel; for instance, such a function can be defined as 2B−R−G, 2B/(R+G), or $B^2$/(RG). In yet another example, two correction factors are calculated as a ratio or a difference between the color channel to be corrected and each of the other two color channels. Since different pixels corresponding to the same index value can produce different correction factors for the same correction factor calculation approach, the final correction factor stored in the table of correction factors is calculated as a function of pixelwise correction factors. In one example, the correction factors for all of the pixels that correspond to the same index are averaged. In another example, different correction factors of the pixels with the same index have different weights; these weights can be derived as a function of some predetermined criterion, such as histogram, distance from a certain value, etc. Once the entire image has been examined to populate the table of correction factors, any gaps remaining in the table of correction factors are filled in by interpolating the existing entries.

The restoration procedure examines each pixel in the image based on the saturation map. First, the index to the correction table is calculated (using the same approach that was used to generate the table) to obtain an appropriate correction factor for a given pixel. Consider again the B channel being corrected. If the correction factor is determined using the same color channel as yB, then its value directly represents the corrected output. In all other cases, the unsaturated color component from the pixel being corrected is combined with the corresponding correction factor (i.e., multiplying it with the color ratio-based factors, or adding it to the color difference-based factors) by following the inverse calculations with respect to correction factor calculations. Note that if more than one table of correction factors has been generated for the same color channel, the final corrected value can be obtained as a combination of corrected values obtained using each of such tables. Any attempt at restoration can be skipped if all three channels of a pixel are saturated.

Although all above-listed examples consider B channel as a channel being corrected, application of the proposed method to other channels is straightforward and will not be discussed here.

It should be also noted that the concept of correction table can be used in other image estimation problems, such as bad pixel and cluster correction, denoising, demosaicking, and so on. Applying the proposed correction procedures requires creating the map of image locations where the correction should be applied. For example, in case of bad pixel/cluster correction, such a map is usually created in the calibration and stored in a camera and/or the so-called raw file. This map can also be created by searching the image for pixels deviating from their neighbors. Such processing is suitable for both bad pixel correction and denoising. In demosaicking, the map of correction locations is known from the underlying layout of color filters. Note that in many estimation applications, the lack of desired information (for example, color information) in a local neighborhood can be overcome by creating and using the correction table based on the concept of superpixels, that is, combining color components available inside a block of pixels.

The philosophy behind the neutralization process is simply that a neutral pixel is more acceptable than the wrong color in a pixel with saturated color channels. Pixels being neutralized are moved towards a neutral value by blending each color channel in the pixel with a luminance value. The luminance value used for neutralization is usually set to the maximum channel value of the pixel being corrected to avoid producing low values in highlight regions. A blending value (between zero and one) is calculated to determine how neutral the final pixel should be. For most pixels not near saturation, the blending value will be zero, meaning the pixels are not affected by the neutralization process.

A computationally efficient way is to convert the saturation map to a new single channel binary map where the value one indicates that the predetermined number of color channels, usually set to three or two, are saturated for a given pixel. This map can be then dilated; for example, for each entry in the map that is equal to one the dilation operation with a spatial parameters N sets the N×N neighborhood of that entry to one. The map can be further enhanced, for example, by passing it through the averaging or Gaussian filter to produce the final spatial blending factors.

An alternative solution to the above spatial blending operation is intensity-driven blending. Again, each pixel is examined. In one example, color components are directly combined, for instance, as (R+G+B)/3, (R+2G+B)/4, 0.3R+0.55G+0.15B, or using other weightings, to calculate the test luminance value. In another example, pixel's color components are first sorted in a descending order and the test intensity value is calculated as a weighted average of these sorted color components. In one example, all weights have the same value. In another example, each sorted color component is associated with different value; for instance, the largest weight is assigned to the largest component and the smallest weight is assigned to the smallest component. This weighted average produces the test luminance value V, which is compared with the predetermined threshold(s) to obtain intensity blending factors. For example, the blending factor can be expressed as max(0, min(1, (V−T)/T). where max and min denote the maximum and minimum operators and T is a predetermined threshold. In another solution, the blending operation is implemented as max(0, min(1, (V−T)/t) where t and T are predetermined thresholds. Other formulas can also be used.

Both spatial and intensity blending factors are values between 0 and 1. In one example, the blending operation is performed using the spatial blending factors. In another example, the blending operation is performed using the intensity blending factors. In yet another example, the final blending factor in each pixel location is obtained as a combination (e.g., average or weighted average) of the spatial and intensity blending factors; note that the final blending value should be kept between zero and one. The blending value is applied to each color channel; the output pixel value is obtained as summation of the neutralization luminance value multiplied with the final blending factor and the pixel value multiplied with the difference between one and the final blending value.

According to one aspect of the present invention, a method is provided for performing at least one of highlight restoration and highlight neutralization of a digital image from a digital camera. Referring first to FIG. 1, a flow diagram depicts an illustrative method 10 according to this aspect of the present invention.

The process begins at reference numeral 12. At reference numeral 14, a reference exposure value is generated as a function of the capture parameters of the camera. The reference exposure value is calculated using the camera capture parameters (aperture, shutter speed, ISO) whereas the actual exposure value is a function of the acquired ambient illumination sensor readings. Example calculations can be found in co-pending application Ser. No. 61/487,902 and entitled "METHOD OF ADJUSTING THE BRIGHTNESS OF A DIGITAL CAMERA IMAGE". This application is expressly incorporated herein by reference.

At reference numeral 16 a blending value is calculated by comparing a reference exposure value and the actual exposure value. The blending value is normalized to have values between zero and one inclusive.

At reference numeral 18, it is determined if the blending value equals zero. If the blending value equals zero, then highlight restoration is performed as shown at reference numeral 20. If the blending value does not equal zero, at reference numeral 22 it is determined if the blending value equals one. If blending value equals one, then highlight neutralization is performed at reference numeral 24.

If the blending value does not equal zero at reference numeral 22, then the blending value must be between zero and one, since it has already been determined at reference numeral 18 that it does not equal zero. In this case, both highlight restoration and highlight neutralization are performed at reference numeral 26, with the results of the two blended according to the blending value. The process then ends at reference numeral 28.

According to one aspect of the present invention, the highlight restoration process returns quality factors that indicate how well the restoration performed. As shown at reference numeral 30, if these quality factors fall below a certain threshold, then highlight restoration is discarded at reference numeral 32 and highlight neutralization is performed instead at reference numeral 24.

According to one exemplary embodiment of the present invention, the blending value is calculated as the difference between the actual exposure value and the reference exposure value, the difference being scaled between zero and one using one or more predetermined parameters such as the maximum and minimum allowable difference values. In another exemplary embodiment, the blending value is calculated as the absolute difference between the actual exposure value and the reference exposure value, the absolute difference being scaled between zero and one using one or more predetermined parameters such as the maximum and minimum allowable absolute difference value. In yet another exemplary embodiment, the blending operation is performed if the difference between the actual exposure value and the reference exposure value exceeds a predetermined threshold. In yet another exemplary embodiment, the blending operation is performed if the exposure deviation (for example, as determined by the camera during the image capture process) from the optimal exposure is greater than the predetermined threshold.

Highlight restoration can attempt to restore saturated pixels by locating nearby pixels having unsaturated values in all color channels ("unsaturated pixels") and using their values to restore the saturated channels of the saturated pixel to unsaturated values. The saturated pixels or its components can be localized in the form of map or list, obtained by comparing the image data values with the saturation level (either predetermined or dictated by the sensor and image processing design characteristics). Pixel values exceeding this saturation threshold are considered as saturated.

Figure 2:
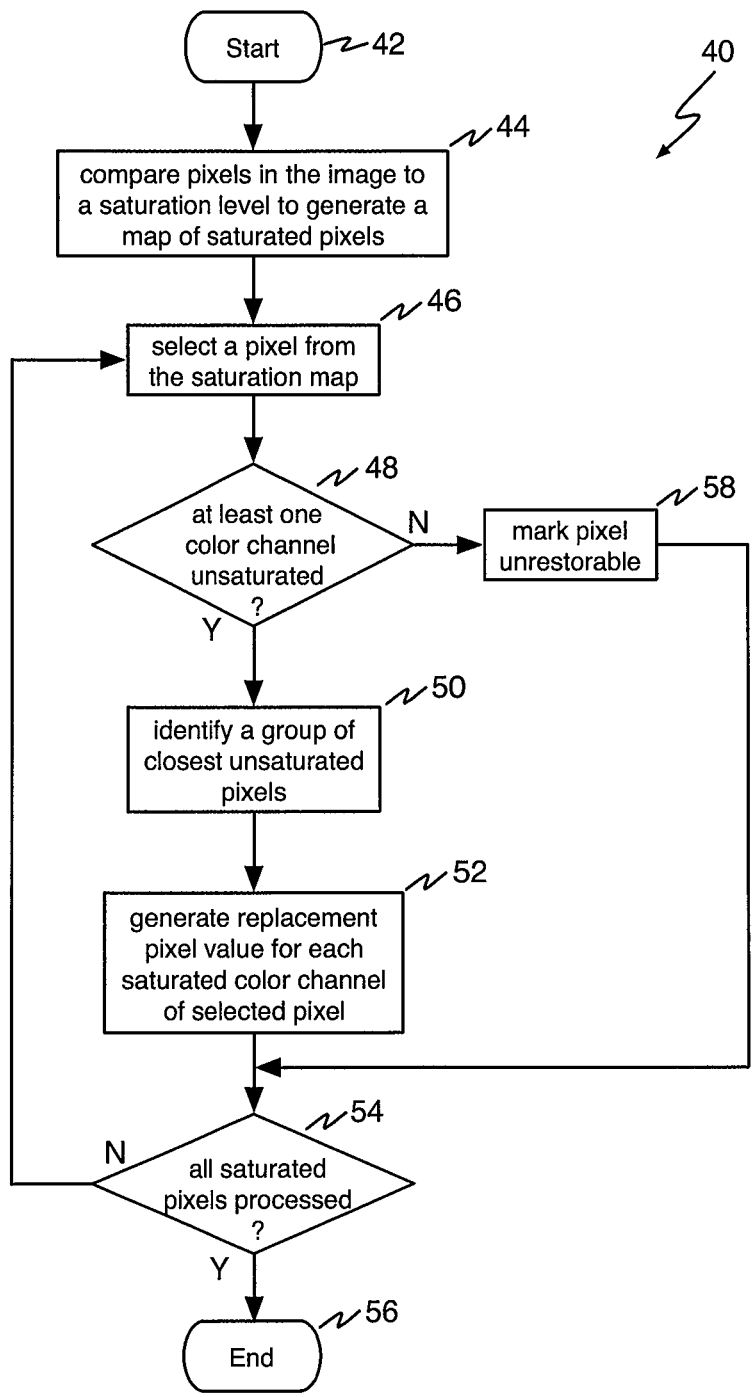
FIG. 2 is a flow diagram showing an illustrative method for performing highlight restoration on a digital image according to an aspect of the present invention.

Referring now to FIG. 2, flow diagram shows an illustrative method 40 for performing highlight restoration on a digital image according to an aspect of the present invention. The process begins at reference numeral 42. At reference numeral 44, the pixels in the image are compared with a saturation level, which is characteristic of the imager, to generate a map of saturated pixels. A saturated pixel is any pixel that has a value higher than the saturation level in one or more color channels.

According to one exemplary embodiment of the present invention, the restoration process uses directly the obtained saturation map. In another example, the restoration process uses the enhanced version of the saturation map in order to avoid using all isolated pixels (based on the assumption that such pixels represent the so-called hot pixels) and/or questionable unsaturated pixels at the very edge of the saturation map to restore saturated pixels. Such enhancement can be obtained, for example, using various filtering operators (e.g., median), morphological operators (e.g., dilation, erosion,), etc.

At reference numeral 46, a saturated pixel is selected from the saturation map (or its enhanced version). At reference numeral 48 it is determined whether at least one of the color channels has an unsaturated value. If at least one of the color channels of the selected pixel has an unsaturated value, the process advances to reference numeral 50, where the closest group of unsaturated pixels above, below, to the left, and to the right of the selected pixel are identified. In one embodiment of the invention, a single unsaturated pixel is identified in each direction.

At reference numeral 52 a replacement value is generated for each saturated color channel of the selected pixel. The replacement value for each saturated channel of the pixel to be repaired is calculated using a combination of the values of the good color channels in the pixel to be restored and the corresponding color channels of the nearby unsaturated pixels. This calculation takes into account the distance to each nearby pixel in interpolating the final result. The closer the pixel the greater its weight in the interpolation. Example calculations can be found in co-pending application Ser. No. 12/961,284, filed Dec. 6, 2010, entitled "CORRECTING DEFECTIVE PIXELS IN DIGITAL COLOR IMAGES." This application is expressly incorporated herein by reference.

After the replacement value has been generated for each saturated color channel of the selected pixel, the process proceeds to reference numeral 54, where it is determined if all of the pixels in the saturation map have been processed. If not, the process returns to reference numeral 46, where another saturated pixel is selected from the saturation map. If all of the pixels in the saturated pixel map have been processed, the process ends at reference numeral 56.

If, at reference numeral 48, it is determined that none of the color channels has an unsaturated value, the pixel is marked as unrestorable at reference numeral 58 and the process ends at reference numeral 56.

Figure 3:
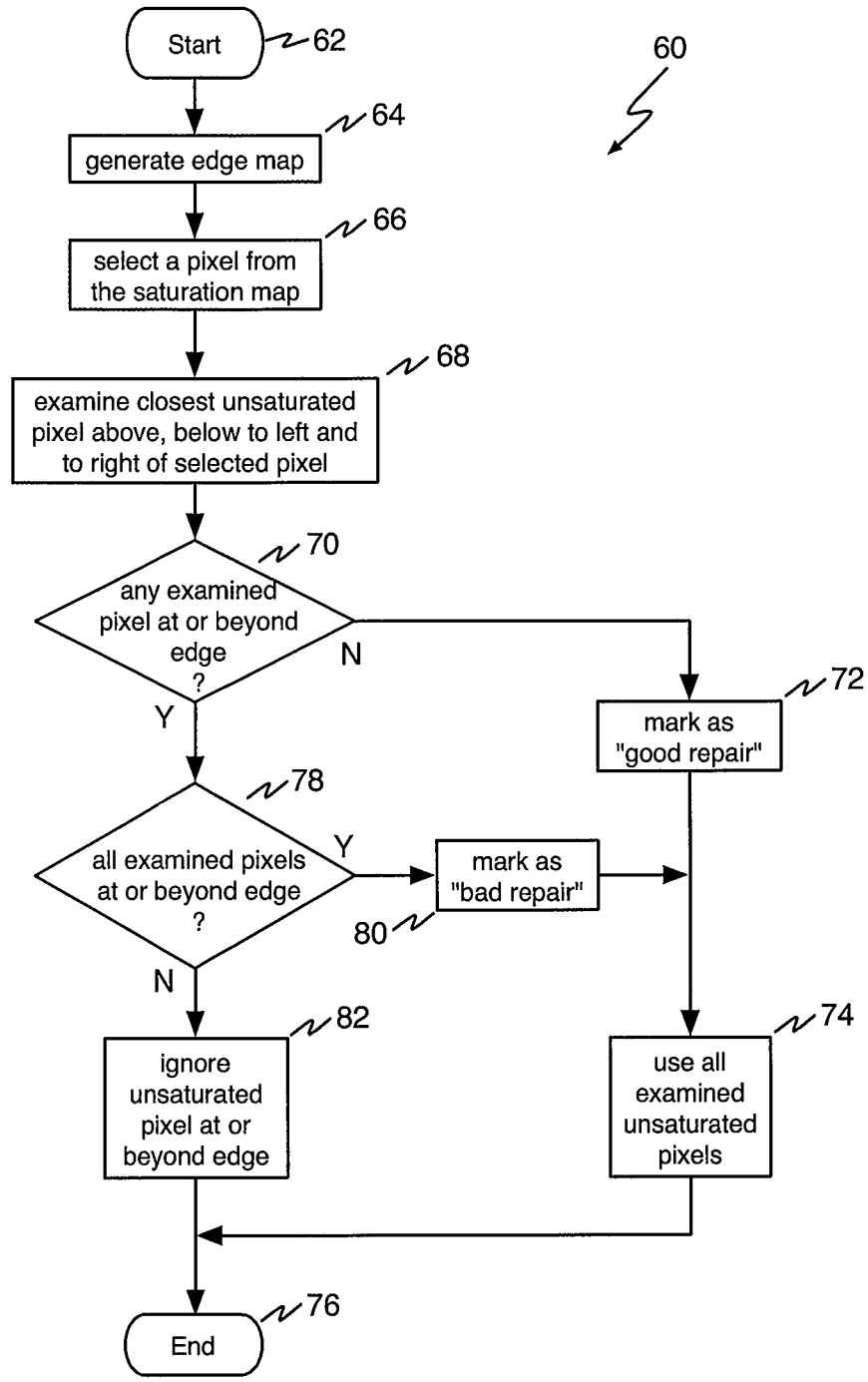
FIG. 3 is a flow diagram showing an illustrative method for selecting unsaturated pixels in order to perform highlight restoration on a digital image according to an aspect of the present invention.

Referring now to FIG. 3, a flow diagram shows an illustrative method 60 for selecting unsaturated pixels to use for performing highlight restoration on a digital image according to an aspect of the present invention. The process begins at reference numeral 62.

According to another aspect of the present invention, shown at reference numeral 64 of FIG. 3, an edge map is generated from the input image data. Any existing edge detection method (e.g., Canny, Sobel, Laplacian) can be used to generate the edge map. The edge map can be further enhanced to suppress noise, remove details unnecessary for restoration process. According to one embodiment, the gradients calculated in the vertical and horizontal direction are scaled by the signal magnitude or the noise model (obtained in calibration), then scaled gradients combined, and then mapped between zero and one using normalization. In another example, a nonlinear function (e.g., sigmoidal, exponential, hyperbolic tangent) can be used to do this mapping. In another example, a scaled edge map can be enhanced via spatial filtering (e.g., averaging filter). In yet another exemplary embodiment, the edge map can be further enhanced via gamma correction, power function, or as max(0,(edges−Beta)/(1−Beta)) where Beta is the predetermined adjustment factor usually set between zero and one. In another example, the scaled edge map or its enhanced version can be thresholded using the predetermined parameter to create a binary edge map.

At reference numeral 66, a saturated pixel is selected from the saturation map. As previously noted, if all three channels of a pixel are saturated, restoration is not attempted. Instead neutralization is performed.

At reference numeral 68, the closest unsaturated pixels above, below, to the left, and to the right of the selected pixel are examined. According to one embodiment of the present invention, for each pixel with one or two saturated channels, the four nearest unsaturated pixels to the left, right, above, and below are located.

At reference numeral 70, using the final edge map as a reference, it is determined whether any of the examined unsaturated pixels are at or beyond an edge (with respect to the pixel being repaired). If not, the process proceeds to reference numeral 72 where the pixel restoration is marked as a "good repair" and a good-repair count is incremented. The process then proceeds to reference numeral 74 where all four unsaturated pixels are employed in the pixel restoration. The process for the selected pixel ends at reference numeral 76.

If at reference numeral 70, it is determined that any of the examined unsaturated pixels are at or beyond an edge (with respect to the pixel being repaired) the process proceeds to reference numeral 78, where it is determined whether all four of the unsaturated pixels are at or beyond an edge. If all of the unsaturated pixels are at or beyond an edge, they are all used in the restoration at reference numeral 74, but the repair is marked as a "bad repair" at reference numeral 80 and a bad-repair count is incremented.

If it was determined at reference numeral 78 that fewer than all unsaturated pixels are at or beyond an edge, or if the saturation map runs up to the edge of the image itself in one of the directions, then that pixel is not used in the restoration and the repair is made with unsaturated pixels not ignored in the determination.

According to one exemplary embodiment of the present invention, the restoration process is iterative. All pixels that had a "good" repair are removed from the saturation map. These can now be used in subsequent iterations to restore saturated pixels that received a "bad repair" in previous iterations. In one example, this correction is performed in more than one iterations. In another example, the correction is performed in a single iteration.

Figure 4:
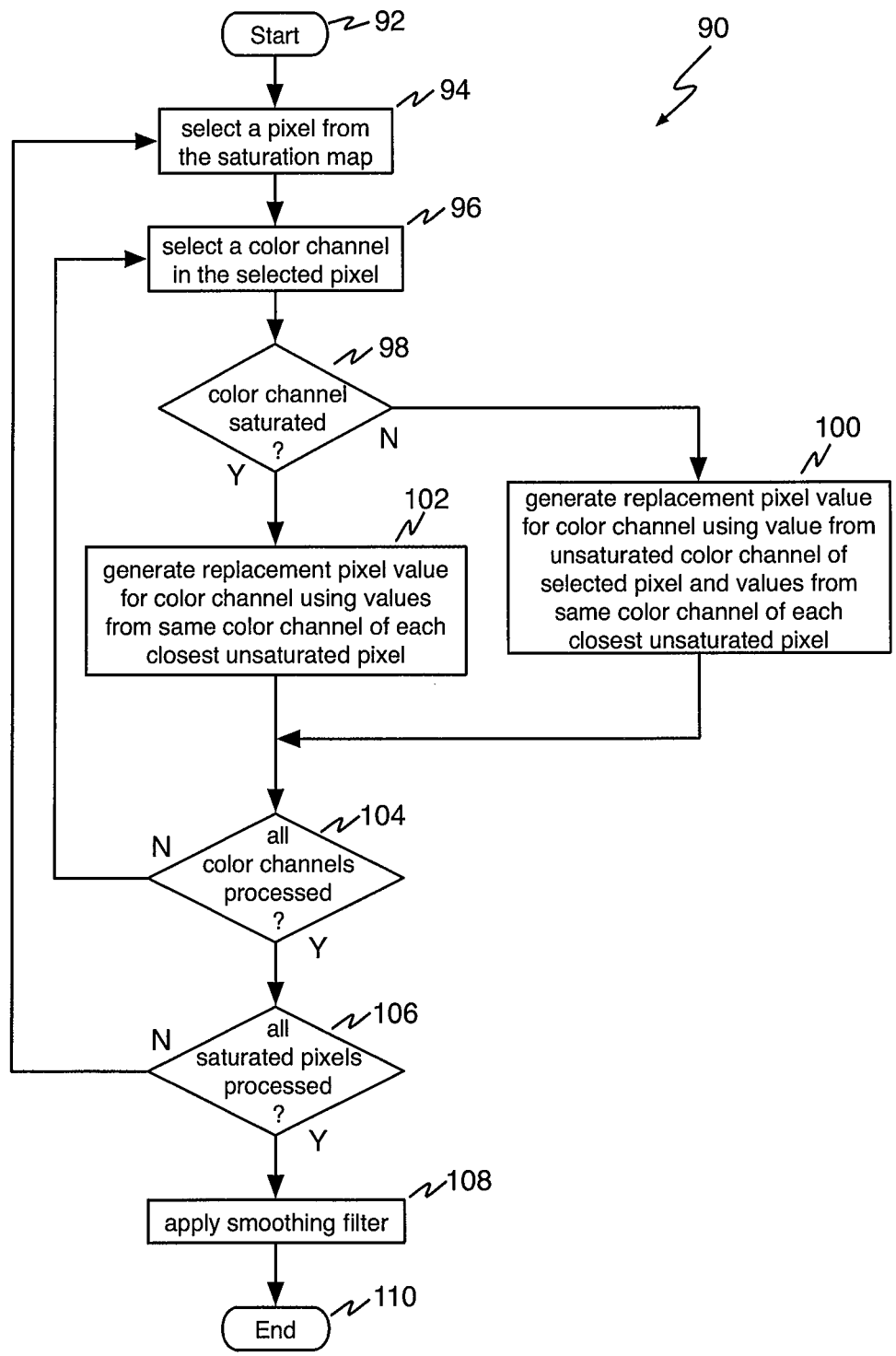
FIG. 4 is a flow diagram showing an illustrative method for performing highlight restoration on a digital image according to an aspect of the present invention.

Referring now to FIG. 4, a flow diagram shows an illustrative method 90 for performing highlight restoration on a digital image according to an aspect of the present invention. The process begins at reference numeral 92.

At reference numeral 94, a saturated pixel is selected from the saturation map. As previously noted, if all three channels of a pixel are saturated, restoration is not attempted. Instead neutralization is performed. At reference numeral 96, a color channel in the selected saturated pixel is selected.

At reference numeral 98, it is determined whether the selected color channel contains a saturated value. If not, the process proceeds to reference numeral 100 where a replacement pixel value is generated for the selected color channel using the value from the unsaturated color channel of the selected pixel and values from the same color channel of each closest unsaturated pixel in the neighborhood of the selected pixel. If it is determined at reference numeral 98 that the selected color channel contains a saturated value, the process proceeds to reference numeral 102 where a replacement pixel value is generated for the selected color channel using only values from the same color channel of each closest unsaturated pixel in the neighborhood of the selected pixel.

At reference numeral 104, it is determined whether all color channels of the selected pixel have been processed. If not, the process returns to reference numeral 96 where an unprocessed color channel from the selected pixel is selected. If all color channels of the selected pixel have been processed, the process proceeds to reference numeral 106, where it is determined whether all saturated pixels have been processed. If not, the process returns to reference numeral 94 where an unprocessed saturated pixel is selected.

If all saturated pixels in the image have been processed, the restoration process is complete. Once the restoration process is completed, the process proceeds to reference numeral 108, where a smoothing filter is applied to each pixel location identified in the saturation map. The purpose of this filter is to suppress any patterns or pixel artifacts created as a side-effect of correction. The process then ends at reference numeral 110.

According to another aspect of the present invention, the highlight restoration method estimates the quality of restored regions and calculates a quality factor. This quality factor is compared to a thresholding parameter (predetermined or calculated for the actual image) to determine whether restoration quality is sufficient or the image should be further processed (e.g., using more iterations, or alternative processing such as highlight neutralization) to produce the required correction improvements, or, in other cases, whether restoration has failed. This aspect of the invention is shown with reference to the flow charts of FIGS. 5 and 6.

Figures 5, 6:
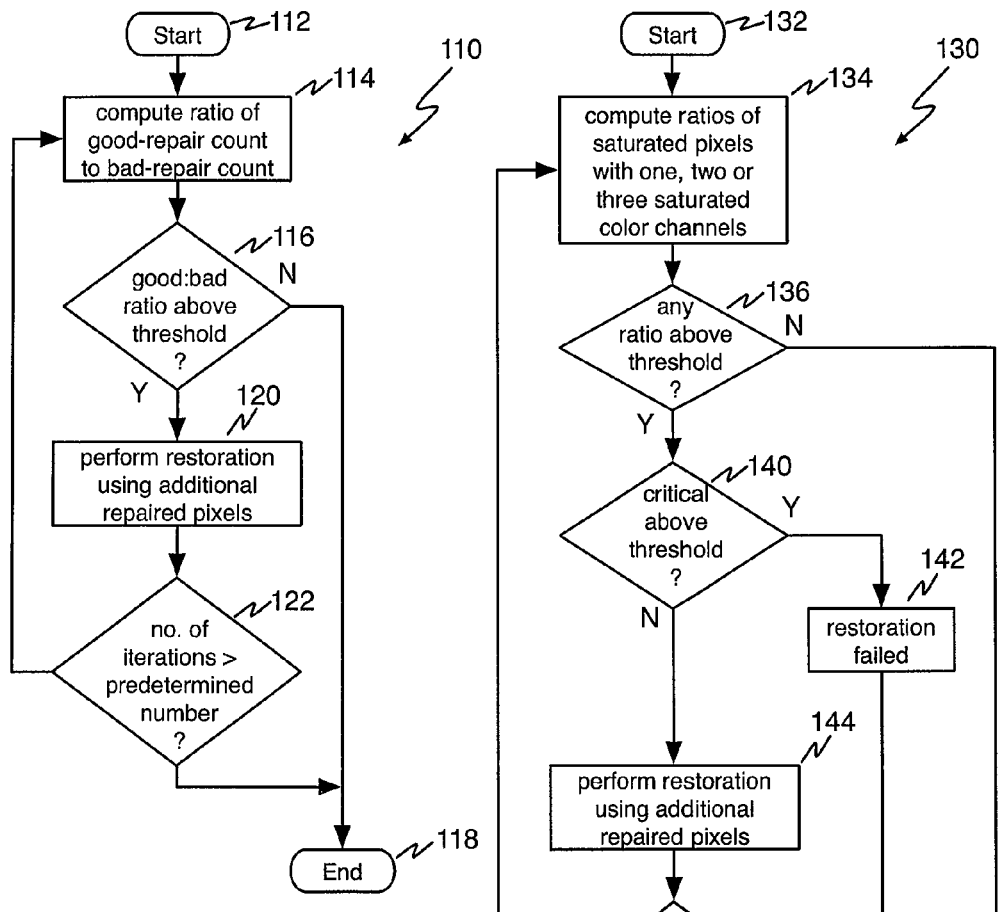
FIGS. 5 and 6 are flow diagrams showing illustrative iterative methods for performing highlight restoration on digital image according to an aspect of the present invention.

In one example, shown in FIG. 5, an exemplary iterative method 110 for performing highlight restoration on a digital image is shown. This highlight restoration method calculates the ratio of good repairs to bad repairs. The method begins at reference numeral 112.

At reference numeral 114, the quality factor expressed as the ratio of the good-repair count to the bad-repair count is determined. At reference numeral 116, it is determined whether this ratio exceeds a threshold. If not, the process ends at reference numeral 118.

If it is determined that the ratio exceeds the threshold at reference numeral 116, the process proceeds to reference numeral 120. At reference numeral 120, the restoration process is performed again, but this time it employs additional pixel data from pixels that were restored the first time the restoration process was performed.

At reference numeral 122 it is determined whether a predetermined number of iterations have been performed. If so, the process ends at reference numeral 118. If it is determined at reference numeral 122 that the predetermined number of iterations have not been performed the process returns to reference numeral 114, where the ratio of the good-repair count to the bad-repair count is determined, now using updated data reflecting the prior restoration process.

According to another embodiment of a method 130 shown with reference to FIG. 6, the highlight restoration routine calculates certain ratios of the number of saturated pixels with one, two, or all three channels saturated. In one example, such ratios are calculated as r/(r+g+b), g/(r+g+b), b/(r+g+b), (r+g)/(r+g+b), (r+b)/(r+g+b), and (g+b)/(r+g+b) where r, g, and b indicate the number of saturated pixels in respective R, G, and B color channels. In another example, such ratios are calculated as r/x, g/x, b/x, (r+g)/x, (r+b)/x, and (g+b)/x where x denotes the number of pixels with at least one channel saturated. In yet another example, such ratios are calculated as $x_1/x_2$, $x_1/x_3$, $x_2/x_3$ where $x_1$, $x_2$, and $x_3$ denote the number of pixels with exactly one, two or three channels saturated. Other solutions are also possible. These ratios are returned to the calling routine, which can be used to determine if the restoration process was deemed a failure. For example, this determination can be based on the comparison of the ratios calculated as above with predetermined thresholds.

The process begins at reference numeral 132. At reference numeral 134 the ratios of saturated pixels with one, two or three saturated color channels is computed. At reference numeral 136, it is determined whether these ratios exceed a threshold value.

If none of the ratios are above the threshold values, the process ends at reference numeral 138. If the ratios are above the threshold, it is determined at reference numeral 140 whether any of the ratios are above a critical value. If so, the restoration process is marked as failed at reference numeral 142 and the process ends at reference numeral 138.

If none of the ratios are above the critical value, the process proceeds to reference numeral 144, where an iterative restoration operation is performed. As previously noted, the iterative restoration operation has the benefit of using pixel values from pixels that were restored during the previous restoration operation.

At reference numeral 146 it is determined whether a predetermined number of iterations have been performed. If so, the process ends at reference numeral 138. If it is determined at reference numeral 146 that the predetermined number of iterations have not been performed, the process returns to reference numeral 134, where the ratios of saturated pixels with one, two or three saturated color channels is again computed. The ratios of saturated pixels with one, two or three saturated color channels is determined, now using updated data reflecting the prior restoration process.

Figure 7:
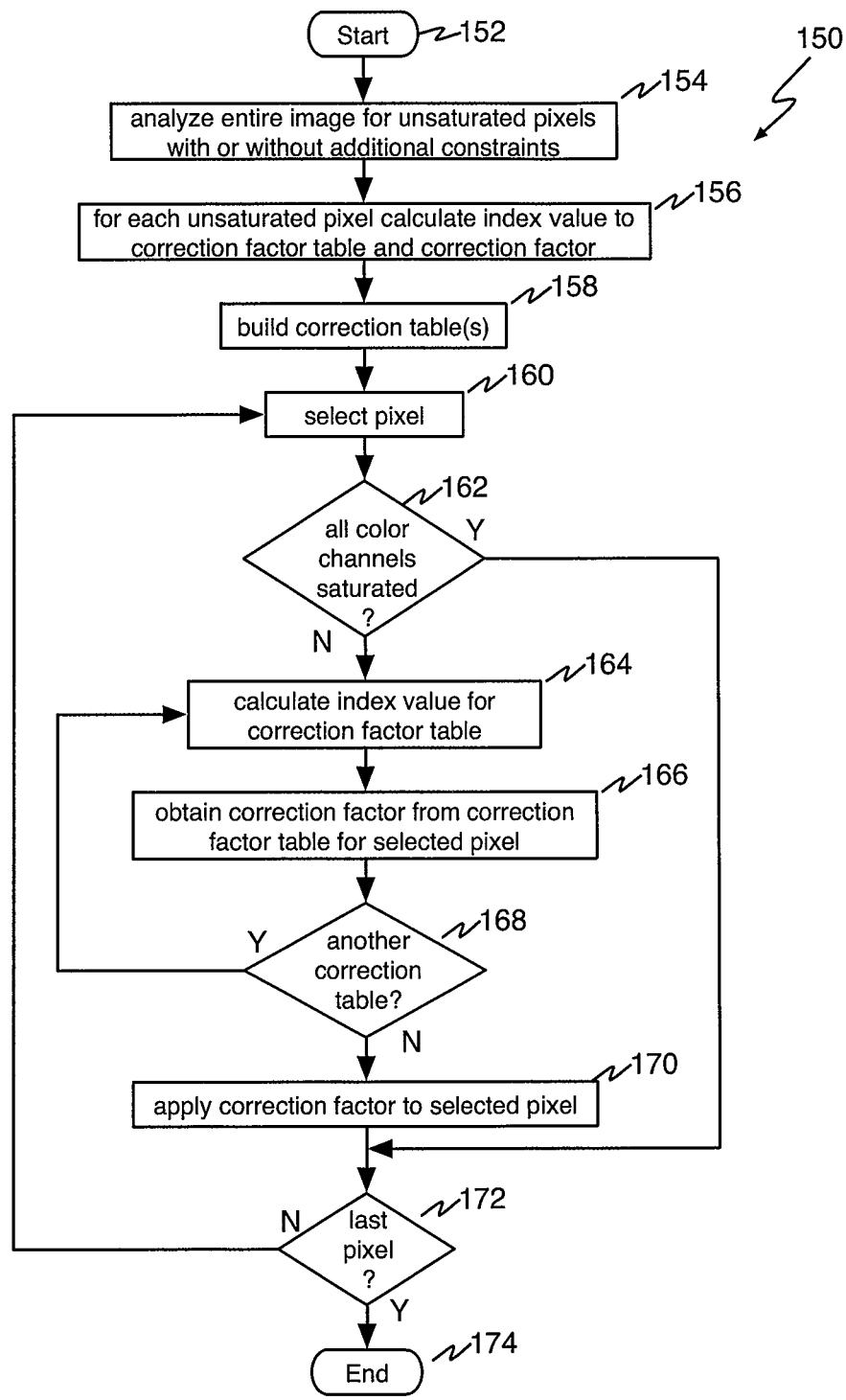
FIG. 7 is a flow diagram showing an illustrative method for building a table of correction factors and applying them to digital image according to an aspect of the present invention.

Referring now to FIG. 7, a flow diagram shows an illustrative method 150 for building a table of correction factors and applying them to an image according to an aspect of the present invention. The method begins at reference numeral 152.

At reference numeral 154, the entire image is analyzed for pixels where the color channel in question is not saturated. This can be combined with other constraints, for example, the pixels to be used in building the table of correction factors have to have their luminance value larger than a certain threshold and/or cannot have any of their color channels clipped, etc.

For each of the pixels that are selected to build the correction table at least two values are calculated, each a function of one or more color channels. One value is used as an index into the table of correction factors, whereas the other value is the correction factor itself. At reference numeral 156, the index value for the correction table is calculated and the value of the correction factor is calculated. Persons of ordinary skill in the art will observe that the order in which these calculations are performed is unimportant. Note that the method of the present invention contemplates calculating more than one correction factor if such operational characteristics are required.

The number of entries in the table of correction factors is denoted by the table size a. This design parameter is usually predetermined. Typically, a is set as smaller than or equal to the number of bits used to represent each color channel; however, too small value of a may reduce the accuracy of correction since too different pixels will be associated with the same index.

The index value is a function of one or more color channels. Consider the B channel being corrected and M being the design parameter, usually equal to the maximum allowed value in a given bit representation (other settings are also possible). In one example, the index is a function of one or two color channels not being restored; for instance, such a function can be defined as amin(R,M/M), amin(G,M)/M, aR/(R+G), or aG/(R+G), with min denoting the minimum operator. In another example, the index is a function of the color channel being restored; for instance, such a function can be defined as amin(B,M)/M. In yet another example, the index is a function of the color channel being restored and one or both other color channels; for instance, such a function can be defined as aB/(R+G+B). Note that the final index is a rounded version of the index value calculated as described above.

The correction factors can also be determined in more than one way. Consider again the B channel being corrected. In one example, the correction factor is calculated as a scaled value of the color channel being corrected; that is, yB where y is either predetermined or adaptively determined based on image statistics. In another example, the correction factor is calculated as a ratio of the color channel to be corrected to one of the other two color channels in the pixel; for instance, such as a correction factor can be defined as B/G, or B/R. In another example, the correction factor is calculated as a difference between the color channel to be corrected and one of the other two color channels in the pixel, that is, B−G or B−R for instance. In another example, the correction factor is calculated as a function of the color channel to be corrected and both other color channels in the pixel; for instance, such a function can be defined as 2B−R−G, 2B/(R+G), or $B^2/(RG)$. In yet another example, two correction factors are calculated as a ratio or a difference between the color channel to be corrected and each of the other two color channels. Since different pixels corresponding to the same index value can produce different correction factors for the same correction factor calculation approach, the final correction factor stored in the table of correction factors is calculated as a function of pixelwise correction factors. In one example, the correction factors for all of the pixels that correspond to the same index are averaged. In another example, different correction factors of the pixels with the same index have different weights; these weights can be derived as a function of some predetermined criterion, such as histogram, distance from a certain value, etc.

Once the entire image has been examined, at reference numeral 158 the table of correction factors is populated and any gaps remaining in the table of correction factors are filled in by interpolating the existing entries. In some cases, more than one table of correction factors may be created. Persons of ordinary skill in the art will recognize that the correction table can be built incrementally as the index values and correction factors are determined.

The restoration procedure examines each pixel in the image based on the saturation map. At reference numeral 160, a pixel is selected. At reference numeral 162, it is determined whether all color channels of the pixel are saturated. If not, the pixel may be processed and at reference numeral 164 the index value for the pixel is calculated (using the same approach that was used to generate the table).

At reference numeral 166 the index value is used to address the correction table to obtain the correction factor.

In some instances more than one correction table is being employed and the final correction value can be obtained as a combination of corrected values obtained using each of such tables. At reference numeral 168, it is determined whether an additional correction table is in use. If so, the process returns to reference numerals 164, and 166 to obtain the additional correction factor. If all correction factor tables have been accessed and correction factors determined, at reference numeral 170 the obtained correction factor is applied to the pixel to produce the corrected pixel value. If the correction factor is determined using the same color channel as yB, then its value directly represents the corrected output. In all other cases, the unsaturated color component from the pixel being corrected is combined with the corresponding correction factor (i.e., multiplying it with the color ratio-based factors, or adding it to the color difference-based factors) by following the inverse calculations with respect to correction factor calculations. The corrected pixel value is directly produced if only one correction table was used. Otherwise, all of the obtained correction factors are applied to the pixel to combine intermediate corrected pixel values if more than one correction table was used. Then, the final corrected pixel value is stored.

At reference numeral 172, it is determined whether all pixels in the image have been processed. If not, the process returns to reference numeral 160 where another pixel is selected for processing. If all pixels in the image have been processed the process ends at reference numeral 174.

According to another aspect of the present invention, the two approaches, one based on the correction table and another that uses unsaturated pixels available in a local neighborhood, can be combined. In example implementations, each saturated pixel can be corrected as the average or weighted average of the two intermediate pixels produced using these two approaches. In such weighted average calculations, the summation of the weights should be equal to one in order to produce an unbiased estimate.

Figure 8:
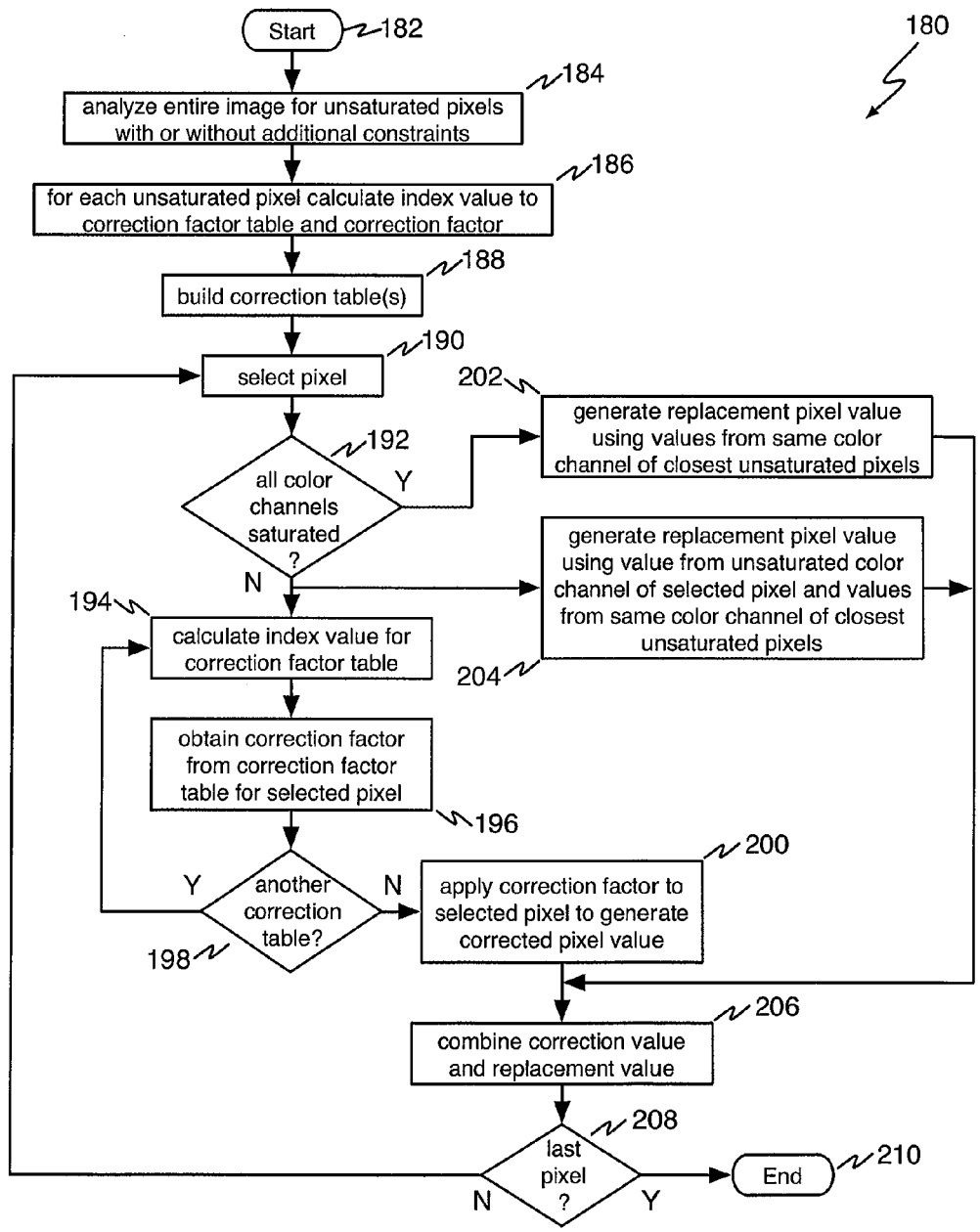
FIG. 8 is a flow diagram showing an illustrative method for performing highlight restoration on a digital image using both a correction table and unsaturated pixels available in a local neighborhood.

Referring now to FIG. 8, a flow diagram shows an illustrative method 180 for performing highlight restoration on a digital image using both a correction table and unsaturated pixels available in a local neighborhood. The method begins at reference numeral 182.

At reference numeral 184, the entire image is analyzed for pixels where the color channel in question is not saturated. This can be combined with other constraints, for example, the pixels to be used in building the table of correction factors have to have their luminance value larger than a certain threshold and/or cannot have any of their color channels clipped, etc.

For each of the pixels that are selected to build the correction table at least two values are calculated, each a function of one or more color channels. One value is used as an index into the table of correction factors, whereas the other value is the correction factor itself. At reference numeral 186, the index value for the correction table is calculated and the value of the correction factor is calculated. Persons of ordinary skill in the art will observe that the order in which these calculations are performed is unimportant. Note that the method of the present invention contemplates calculating more than one correction factor if such operational characteristics are required.

Once the entire image has been examined, at reference numeral 188 the table of correction factors is populated and any gaps remaining in the table of correction factors are filled in by interpolating the existing entries. In some cases, more than one table of correction factors may be created. Persons of ordinary skill in the art will recognize that the correction table can be built incrementally as the index values and correction factors are determined.

The restoration procedure examines each pixel in the image based on the saturation map. At reference numeral 190, a pixel is selected. At reference numeral 192, it is determined whether all color channels of the pixel are saturated. If not, the pixel may be processed and, at reference numeral 194, the index value for the pixel is calculated (using the same approach that was used to generate the table).

At reference numeral 196 the index value is used to address the correction table to obtain the correction factor.

In some instances more than one correction table is being employed and the final correction value can be obtained as a combination of corrected values obtained using each of such tables. At reference numeral 198, it is determined whether an additional correction table is in use. If so, the process returns to reference numerals 194 and 196 to obtain the additional correction factor. If all correction factor tables have been accessed and correction factors determined, the process continues at reference numeral 200 where the obtained correction factors are applied to the pixel to produce the corrected pixel value. If the correction factor is determined using the same color channel as yB, then its value directly represents the corrected output. In all other cases, the unsaturated color component from the pixel being corrected is combined with the corresponding correction factor (i.e., multiplying it with the color ratio-based factors, or adding it to the color difference-based factors) by following the inverse calculations with respect to correction factor calculations. The corrected pixel value is directly produced if only one correction table was used. Otherwise, all of the obtained correction factors are applied to the pixel to combine intermediate corrected pixel values if more than one correction table was used.

If, at reference numeral 192, it was determined that all of the color channels are saturated, at reference numeral 202 replacement pixel values are generated using values from same color channel of closest unsaturated pixels. In addition, if, at reference numeral 192, it was determined that all of the color channels are not saturated, at reference numeral 204 replacement pixel values are generated using values from unsaturated color channel of selected pixel and values from same color channel of closest unsaturated pixels.

Upon completing the processes at one of reference numerals 202 and 204 the process proceeds to reference numeral 206 where the corrected pixel value obtained using at least one correction factor table and the replacement pixel value obtained using neighboring pixels are combined to produce the final corrected pixel value. As previously noted, in example implementations each saturated pixel can be corrected as the average or weighted average of the two intermediate pixel values produced using these two approaches. In such weighted average calculations, the summation of the weights should be equal to one in order to produce an unbiased estimate.

At reference numeral 208, it is determined whether all pixels in the image have been processed. If not, the process returns to reference numeral 190 where another pixel is selected for processing. If all pixels in the image have been processed, the process ends at reference numeral 210.

In addition to performing the restoration method disclosed herein, the saturated pixels can be processed by applying the neutralization method. Highlight neutralization aims at suppressing the color information in highlight regions. Any existing neutralization method can be used to complete this task in the proposed highlight processing framework.

According to one exemplary embodiment of the present invention, the neutralization method looks at all pixels to produce the intensity blending factors. For those pixels where all three channels exceed a certain threshold (determined as some value significantly below the saturation level; for example, the threshold equal to 2000 or 3000 in a 12-bit image representation), then the pixel value is moved toward neutral according to how close it actually is to the saturation level. This is reflected by the intensity blending factor which increases with the pixel intensity. If all channels are above the saturation level, then the pixel is completely neutralized.

Figure 9:
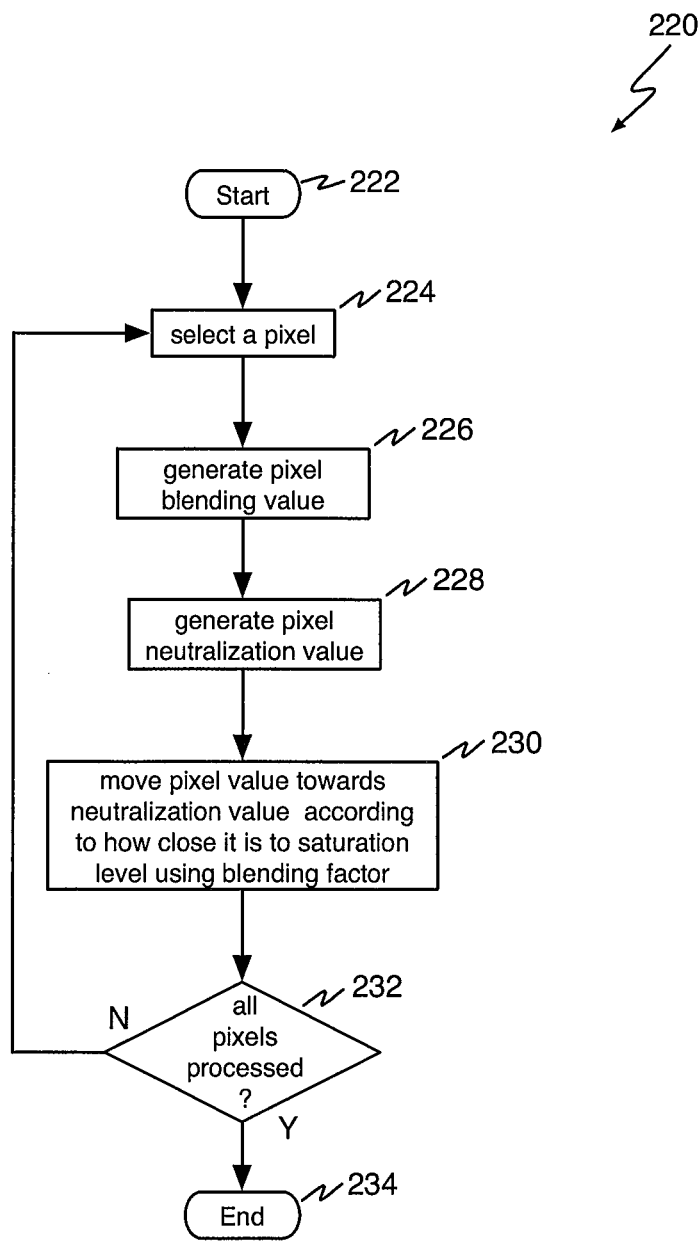
FIG. 9 is a flow diagram showing an illustrative method of highlight neutralization according to an aspect of the present invention.

Referring now to FIG. 9, a flow diagram shows an illustrative method 220 for performing highlight neutralization according to an aspect of the present invention. The method begins at reference numeral 222.

At reference numeral 224, a pixel from the image is selected. A pixel blending factor is generated at reference numeral 226. At reference numeral 228, a neutralization value is generated for the selected pixel. At reference numeral 230, the pixel value is moved towards the neutralization value according to how close it is to the saturation level using the blending factor.

At reference numeral 232, it is determined whether all pixels in the image have been processed. If not, the process returns to reference numeral 224 where another pixel is selected for processing. If all pixels in the image have been processed, the process ends at reference numeral 234.

According to another exemplary embodiment of the present invention, the saturation map is used to guide the neutralization method. The saturation map can be enhanced prior to using it in the subsequent processing step. Such enhancement can be obtained, for example, using various filtering operators (e.g., median), morphological operators (e.g., dilation, erosion), etc. In the next step, the saturation map can be smoothed using a spatial averaging filter to create the spatial blending map. Next, the blending map is used to blend the original image (or its highlight-restored version) with the neutralization signal which can be obtained as the maximum or weighted average of color components in each pixel location.

Figure 10:
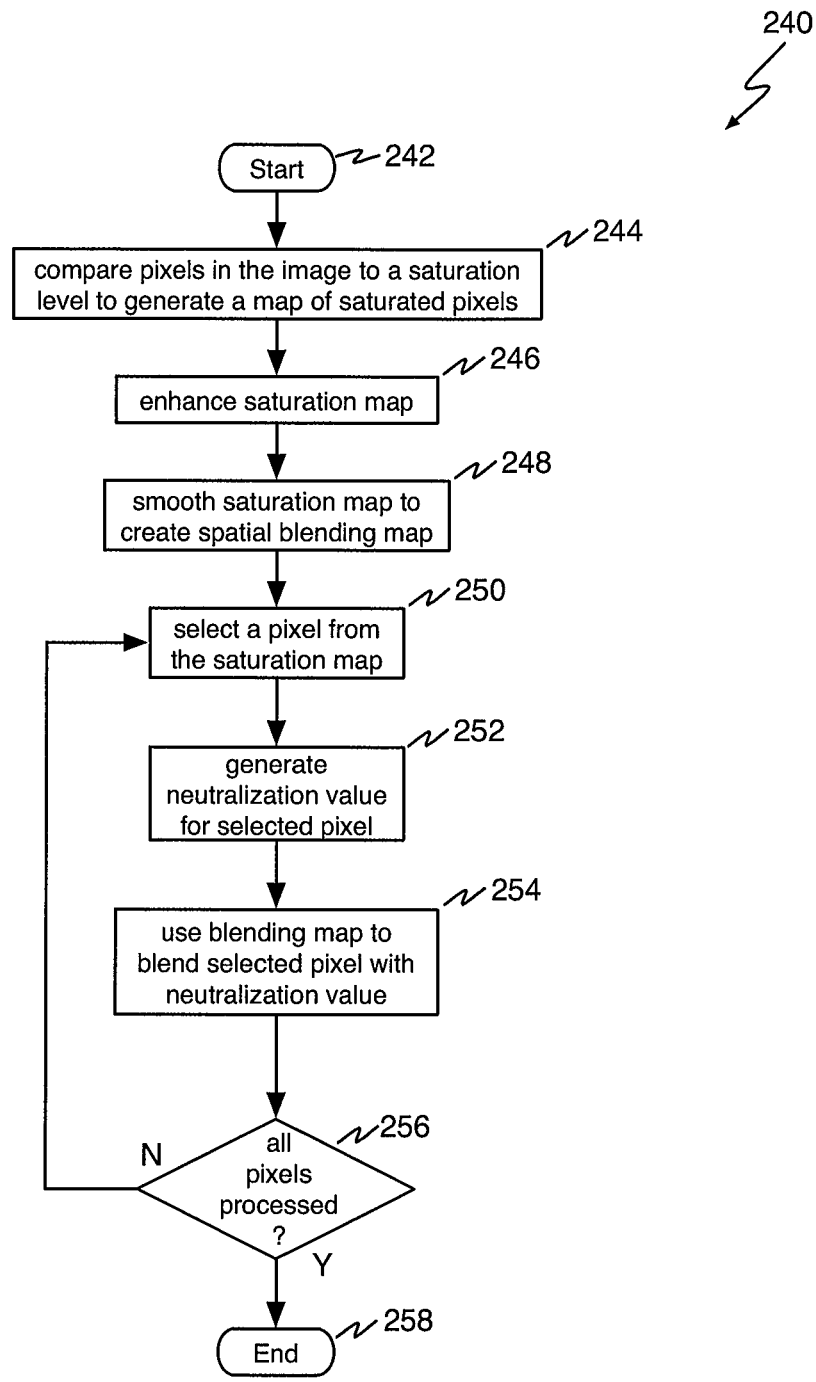
FIG. 10 is a flow diagram showing another illustrative method of highlight neutralization according to an aspect of the present invention.

Referring now to FIG. 10, a flow diagram shows an illustrative method 240 for performing highlight neutralization according to an aspect of the present invention. The method begins at reference numeral 242.

At reference numeral 244, pixels in the image are compared to a saturation level to generate a map of saturated pixels. At reference numeral 246, the saturation map is enhanced as disclosed herein. At reference numeral 248, the saturation map is smoothed to create spatial blending map. At reference numeral 250, a pixel is selected from the saturation map. At reference numeral 252, a neutralization value is generated for the selected pixel. At reference numeral 254, the blending map is used to blend the selected pixel with the neutralization value.

At reference numeral 256, it is determined whether all pixels in the image have been processed. If not, the process returns to reference numeral 250 where another pixel is selected for processing. If all pixels in the image have been processed, the process ends at reference numeral 258.

According to yet another exemplary embodiment of the present invention, the final blending factor in each pixel location is obtained as a combination (e.g., average or weighted average) of the spatial and intensity blending factors; note that the final blending factor should be kept between zero and one. The blending value is applied to each color channel; the output pixel value is obtained as summation of the neutralization luminance value multiplied with the final blending factor and the pixel value multiplied with the difference between one and the final blending value.

Figure 11:
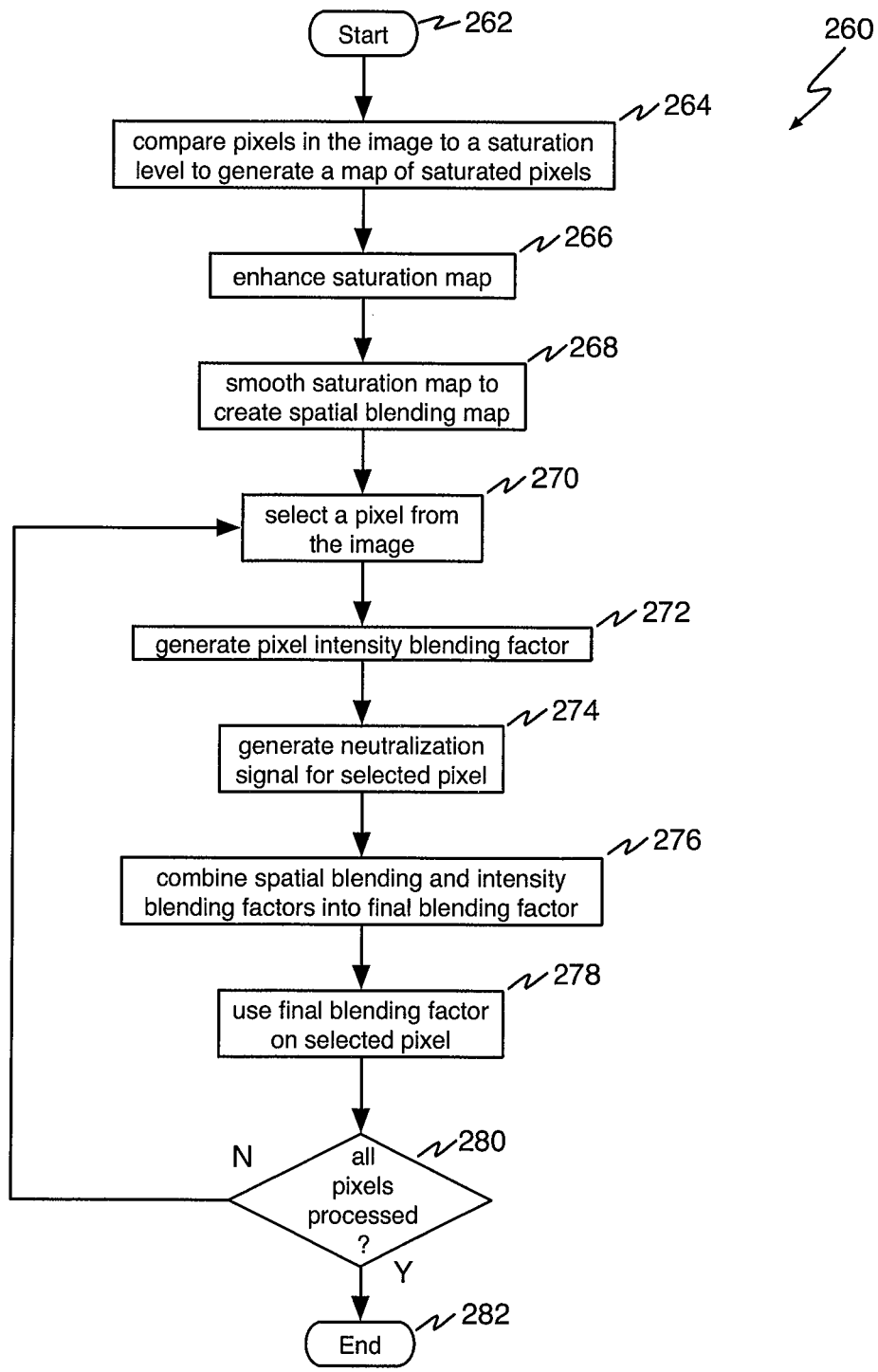
FIG. 11 is a flow diagram showing another illustrative method of highlight neutralization according to an aspect of the present invention.

Referring now to FIG. 11, a flow diagram shows an illustrative method 260 for performing highlight neutralization according to an aspect of the present invention. The method begins at reference numeral 262.

At reference numeral 264, pixels in the image are compared to a saturation level to generate a map of saturated pixels. At reference numeral 266, the saturation map is enhanced as disclosed herein. At reference numeral 268, the saturation map is smoothed to create spatial blending map. At reference numeral 270, a pixel is selected from the saturation map.

At reference numeral 272, an intensity blending factor is generated. At reference numeral 274, a neutralization value is generated for the selected pixel. At reference numeral 276, spatial blending and intensity blending factors are combined into a final blending factor. At reference numeral 278 the combined blending factor is used to alter the selected pixel.

At reference numeral 280, it is determined whether all pixels in the image have been processed. If not, the process returns to reference numeral 270 where another pixel is selected for processing. If all pixels in the image have been processed, the process ends at reference numeral 282.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. Inventive aspects lie in less than all features of a single foregoing disclosed embodiment, and each embodiment described herein may contain more than one inventive feature.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for restoring pixels in a digital image having saturated values in a color channel, comprising:
creating a saturation map of the image by comparing the pixel values with a predetermined threshold;
analyzing the image to select pixels having unsaturated values in the color channel;
creating only a single table of correction factors for the entire image by selecting pixels from the entire image having an unsaturated value in a selected color channel and for each selected pixel, calculating at least two values as a function of at least one color channel, a first value being an index into the single table of correction factors, and a second value being a correction factor stored in the single table of correction factors at a location pointed to by the index, the number of entries in the single table of correction factors being set as smaller than or equal to the number of bits used to represent each color channel;
for each pixel in the image having unsaturated values in the color channel, calculating an index pointer to the single table of correction factors, and applying a correction factor stored in the single table of correction factors at a location pointed to by the index pointer to the saturated value of the color channel to obtain a corrected value; and
replacing the saturated value in the color channel with the corrected value.

2. The method of claim 1 wherein creating the single table of correction factors comprises creating more than one table of correction factors.

3. The method of claim 1 further comprising selecting only pixels having a preselected characteristic for inclusion in the single table of correction factors.

4. The method of claim 3 wherein the preselected characteristic is pixels that have a luminance value larger than a predetermined threshold and do not have any of their color channels saturated.

5. The method of claim 1 wherein the number of entries in the single table of correction factors is smaller than or equal to the number of bits used to represent each color channel.

6. The method of claim 1 wherein the index into the single table of correction factors is a function of at least one of the color channels not being restored.

7. The method of claim 1 wherein the index into the single table of correction factors is a function of the color channel being restored.

8. The method of claim 1 wherein the index into the single table of correction factors is a function of the color channel being restored and at least one other color channel.

9. The method of claim 1 wherein correction factors to be stored in the single table of correction factors are calculated as a scaled value of the color channel being corrected.

10. The method of claim 1 wherein correction factors to be stored in the single table of correction factors are calculated as a ratio of the color channel to be corrected to one of the other color channels in the pixel.

11. The method of claim 1 wherein correction factors to be stored in the single table of correction factors are calculated as a difference between the color channel to be corrected and one of the other color channels in the pixel.

12. The method of claim 1 wherein correction factors to be stored in the single table of correction factors are calculated as a function of the color channel to be corrected and all other color channels in the pixel.

* * * * *